United States Patent
Nakai

(10) Patent No.: US 6,930,833 B2
(45) Date of Patent: Aug. 16, 2005

(54) DIFFRACTIVE OPTICAL ELEMENT, AND OPTICAL SYSTEM AND OPTICAL APPARATUS PROVIDE WITH THE SAME

(75) Inventor: Takehiko Nakai, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/453,561

(22) Filed: Jun. 2, 2003

(65) Prior Publication Data

US 2003/0231396 A1 Dec. 18, 2003

(30) Foreign Application Priority Data

Jun. 17, 2002 (JP) ........................................ 2002-176144

(51) Int. Cl.[7] .................................................. G02B 5/18
(52) U.S. Cl. ...................... 359/569; 359/576; 359/566
(58) Field of Search ................................ 359/569, 576, 359/566, 565, 571

(56) References Cited

U.S. PATENT DOCUMENTS

| | | | |
|---|---|---|---|
| 5,044,706 A | 9/1991 | Chen | |
| 5,790,321 A | 8/1998 | Goto | |
| 5,847,877 A | 12/1998 | Imamura et al. | |
| 6,157,488 A | 12/2000 | Ishii | |
| 6,560,019 B2 * | 5/2003 | Nakai | 359/569 |
| 6,671,104 B2 * | 12/2003 | Endo | 359/691 |
| 2001/0015848 A1 | 8/2001 | Nakai | |
| 2001/0036012 A1 | 11/2001 | Nakai et al. | |
| 2001/0055157 A1 * | 12/2001 | Shirasuna | 359/566 |
| 2002/0126397 A1 * | 9/2002 | Fujimoto | 359/762 |

FOREIGN PATENT DOCUMENTS

| | | |
|---|---|---|
| EP | 0 902 304 | 3/1999 |
| EP | 1 065 531 | 1/2001 |
| EP | 1 148 355 | 10/2001 |
| JP | 1992/213421 | 8/1992 |
| JP | 1994/324262 | 11/1994 |
| JP | 1997/127322 | 5/1997 |
| JP | 2000/98118 | 4/2000 |

OTHER PUBLICATIONS

European Search Report issued in counterpart application EP 03 25 3415, dated Jan. 11, 2005.

* cited by examiner

*Primary Examiner*—Fayez G. Assaf
(74) *Attorney, Agent, or Firm*—Morgan & Finnegan, LLP

(57) ABSTRACT

A layered diffractive optical element is disclosed, with which a high diffraction efficiency is attained over a broad region of used wavelengths, and with which diffraction light of unnecessary diffraction orders can be suppressed. A diffractive optical element of the present invention includes a plurality of diffraction gratings made of materials with different Abbe numbers, the plurality of diffraction gratings being layered with each other. Moreover, the partial dispersion ratio with respect to a g-line and a F-line of the material constituting at least one of the plurality of diffraction gratings satisfies the condition represented by a specified expression.

12 Claims, 19 Drawing Sheets

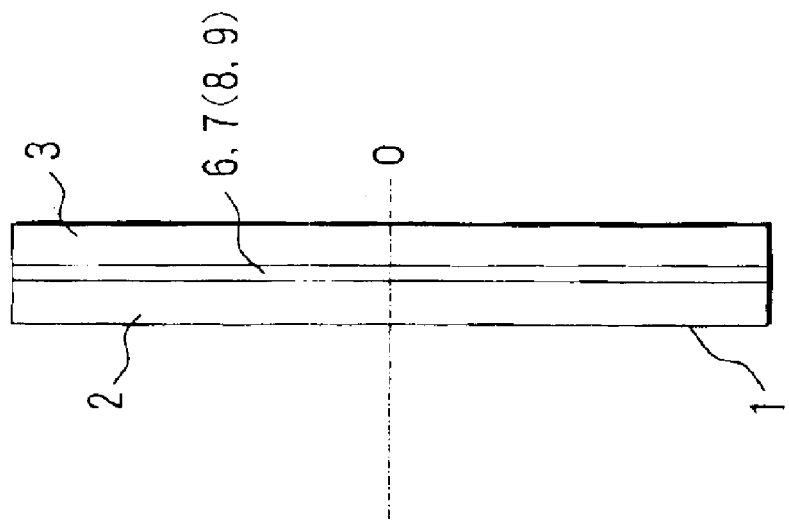
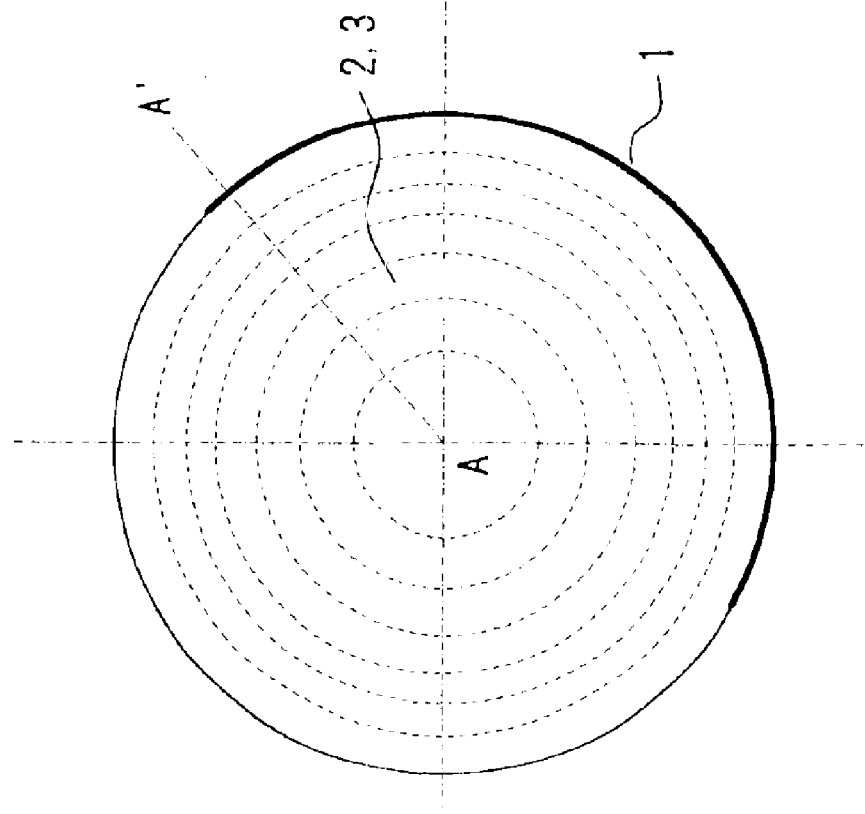
FIG.1 (A)  FIG.1 (B)

DIFFRACTIVE OPTICAL ELEMENT, AND OPTICAL SYSTEM AND OPTICAL APPARATUS PROVIDE WITH THE SAME

BACKGROUND OF THE INVENTION

1. Field of the Invention

The present invention relates to diffractive optical elements, and more particularly to layered (laminated) diffractive optical elements, as well as optical systems and optical apparatuses using the same.

2. Description of the Related Art

As methods for reducing the chromatic aberration of lens systems, there are methods of combining glass materials, but there is also the method of providing a diffractive optical element having a diffraction effect on a portion of the optical system.

Such methods have been proposed or disclosed for example in such documents as SPIE Vol. 1354 International Lens Design Conference (1990), in Japanese Patent Laid-Open No. 1992-213421 (corresponding to U.S. Pat. No. 5,044,706), Japanese Patent Laid-Open No. 1994-324262 (corresponding to U.S. Pat. No. 5,790,321), and U.S. Pat. No. 5,044,706.

Methods using diffractive optical elements utilize the physical phenomenon that chromatic aberration at refractive surfaces and diffractive surfaces occurs in opposite directions with respect to light rays of a certain reference wavelength.

Furthermore, diffractive optical elements can be provided with an aspheric lens effect by appropriately changing the period of their periodic structure, so that they are also effective for reducing other aberrations besides chromatic aberration.

In lens systems having a diffractive optical element, when light rays of the used wavelength region are concentrated to diffracted light of one specific order (referred to as "specific order" or "design order" in the following), then the intensity of the diffracted light of other diffraction orders becomes low, and if their intensity is zero, diffraction light thereof is not present at all.

However, if there is diffracted light of an order other than the design order, and if it has a certain intensity, then it is formed images to a different location than the light of the design order, so that it becomes flare light in the optical system.

Consequently, in order to utilize the diffractive optical element's effect of reducing aberrations, the diffraction efficiency of the diffracted light of the design order needs to be sufficiently high for the entire used wavelength region, and it is important to adequately consider the spectral distribution of the diffraction efficiency for the design order as well as the behavior of the diffracted light of orders other than the design order.

FIG. 16 shows a diffractive optical element made of a substrate 302 and a diffraction grating 301 formed on the substrate 302 (referred to as "single-layer DOE" in the following). The characteristics of the diffraction efficiency for the specific order when this single-layer DOE is formed on a certain surface are shown in FIG. 17.

In FIG. 17, the horizontal axis marks the wavelength of incident light, and the vertical axis marks the diffraction efficiency (this is also the same in all other figures illustrating diffraction efficiency). The values of the diffraction efficiency are the ratios of the light amount of diffracted light at each order with respect to the light amount of the entire transmitted light, and light reflected at grating boundary surfaces is not considered, as it would only complicate the explanations.

As shown in FIG. 17, the single-layer DOE shown in FIG. 16 is designed such that the diffraction efficiency becomes highest at the used wavelength region for the first diffraction order (bold solid line in FIG. 17), so the design order is the first order. At this design order, the diffraction efficiency becomes highest at a certain wavelength (below, this wavelength is referred to as the "design wavelength"), and gradually becomes lower at other wavelengths. Diffraction light at other orders increases by the same rate as the diffraction efficiency at the design order decreases, and this diffraction light at other orders becomes flare light. FIG. 17 also shows the diffraction efficiency of other orders near the design order (namely zero-th order and second order, which are the orders plus or minus 1 of the first order (design order)).

The following has been proposed as a scheme for reducing the influence of the flare light that is produced like this.

With the diffractive optical element proposed in Japanese Patent Laid-Open No. 1997-127322 (corresponding to U.S. Pat. No. 6,157,488), a somewhat higher diffraction efficiency can be achieved for the design order across the entire visible wavelength region, as shown in FIG. 19, as shown in FIG. 18, by optimally selecting three different grating materials 306 to 308 and two different grating thicknesses $d_1$ and $d_2$, and adhering the three diffraction gratings together with identical grating pitch distribution.

Furthermore, as shown in FIG. 13, the diffractive optical element proposed in Japanese Patent Laid-Open No. 2000-98118 (corresponding to the U.S. patent application Publication Ser. No. 2001/0015848A1) is a diffractive optical element having a structure in which element portions 202 and 203 that respectively include a single-layer DOE are placed in proximity to one another sandwiching an air layer 210 between them (in the following, diffractive optical layers with such a structure are referred to as "layered DOEs"). In this layered DOE, by optimizing the refractive index, dispersion characteristics (Abbe number $v_d$) and grating thickness of each layer of the materials constituting each single-layer DOE, a high diffraction efficiency can be achieved for the design order across the entire visible wavelength spectrum, as shown in FIG. 14.

Furthermore, by prescribing the Abbe numbers of the materials constituting the diffraction grating, a high diffraction efficiency is achieved with grating thicknesses of 10 µm or less. Correspondingly, as shown in FIG. 15, also the diffraction efficiencies of the diffraction orders plus or minus 1 of the design order can be better suppressed than with the single-layer DOE of FIG. 17.

By using the diffractive optical elements proposed in the above-noted Japanese Patent Laid-Open No. 1997-127322 and Japanese Patent Laid-Open No. 2000-98118, the diffraction efficiency of the design order is improved greatly compared to single-layer DOEs, attaining a high diffraction efficiency of at least 94% over the entire used wavelength region, and at least 98% in the main wavelength region of 450 nm to 650 nm. Moreover, flare light of unnecessary diffraction orders is favorably reduced to 2% or less over the entire used wavelength region, and 0.6% or less in the main wavelength region of 450 nm to 650 nm.

For this reason, when applied to optical systems in which the image-taking or projection conditions do not change (such as reader lenses of copying machines or projection lenses of liquid crystal projectors), the influence of flare can be suppressed with single-lens DOEs to a level at which it is not a problem.

However, in optical systems of optical apparatuses that take a variety of object images at a variety of conditions, such as still cameras or video cameras, even tiny amounts of remaining flare may become a problem.

For example, if there is a light source in the objects, then image-taking is generally performed not such that the light source is properly exposed, but such that the object other than the light source is suitably exposed.

For this reason, the image of the light source within the objects is taken at an exposure above the suitable exposure. For example, if the light source is exposed at 500 times the suitable exposure, then even with a flare of barely 0.6% remaining, the flare of the light source is multiplied by 500 times:

0.6×500=300%, thus becoming three times the flare of the suitable exposure, and will definitely show up in the taken image.

Thus, if a layered DOE is applied to an optical system of a still camera or a video camera, even a tiny amount of flare may become a problem.

SUMMARY OF THE INVENTION

It is an object of the present invention to provide a layered diffractive optical element with which a high diffraction efficiency can be attained over a broad used wavelength region for light of a specific diffraction order, and with which diffraction light of unnecessary diffraction orders can be suppressed. It is a further object of the present invention to provide an optical system using such a diffractive optical element as well as an optical apparatus provided with such an optical system.

To attain these objects, one aspect of a diffractive optical element of the present invention includes a plurality of diffraction gratings made of materials with different Abbe numbers, the plurality of diffraction gratings being layered (laminated) with each other. Moreover, the partial dispersion ratio with respect to a g-line and a F-line of the material constituting at least one of the plurality of diffraction gratings satisfies the condition represented by a specified expression (referred to as "Expression (1)" in the following).

These and further objects and features of the invention will become apparent from the following detailed description of preferred embodiments thereof taken in conjunction with the accompanying drawings.

BRIEF DESCRIPTION OF THE DRAWINGS

FIG. 1(A) is a front view of a diffractive optical element according to Embodiment 1 of the present invention, and FIG. 1(B) is a lateral view of that diffractive optical element.

DETAILED DESCRIPTION OF THE PREFERRED EMBODIMENTS

The following is a an explanation of embodiments of the present invention, with reference to the accompanying drawings.

Embodiment 1

Figure 2:
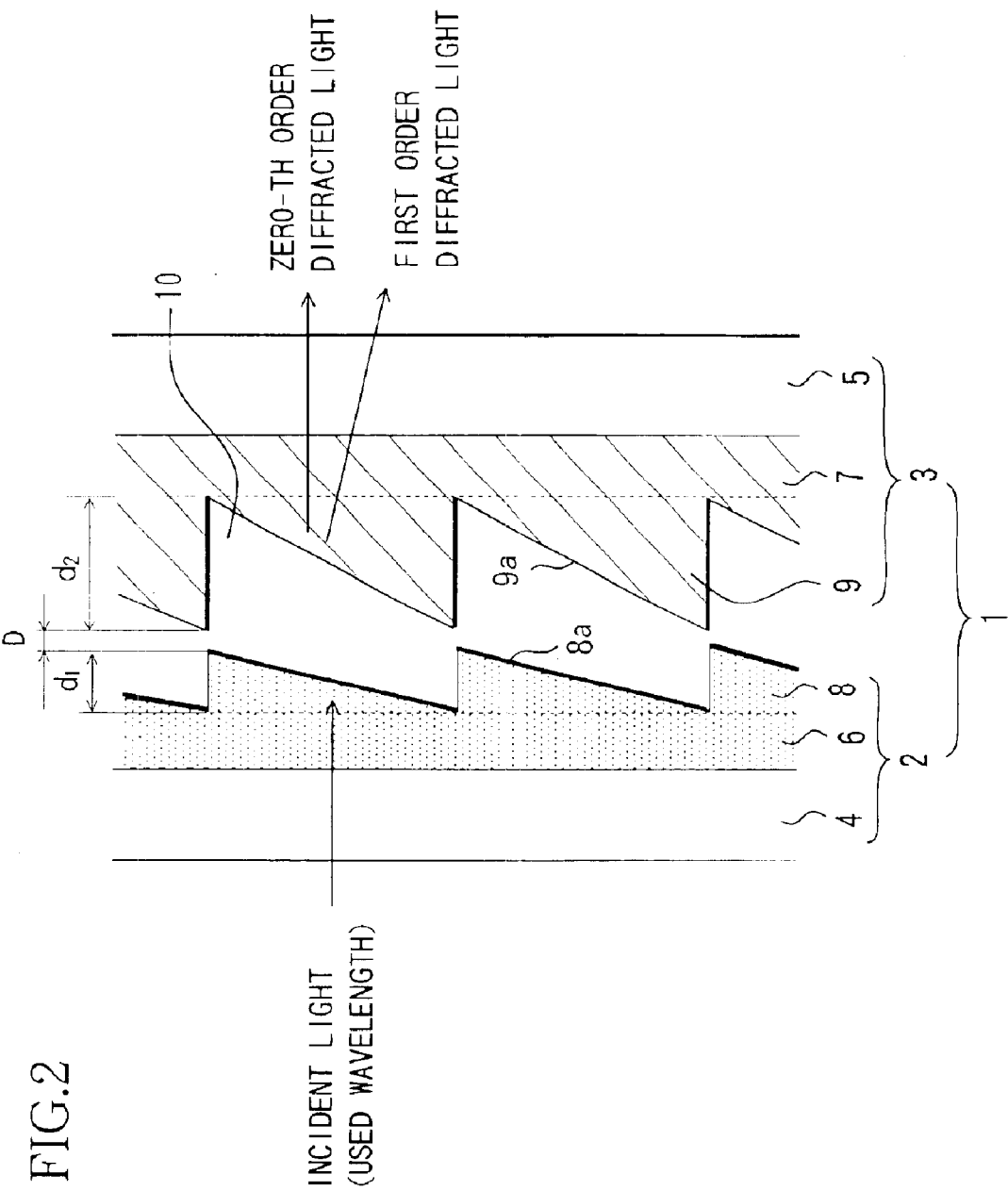
FIG. 2 is a partial cross-sectional view of the diffractive optical element of Embodiment 1.

FIG. 1(A) is a front view of a diffractive optical element according to Embodiment 1 of the present invention, and FIG. 1(B) is a lateral view of that diffractive optical element. FIG. 2 shows a partially enlarged view of the cross-sectional shape taken along the line A–A' of the diffractive optical element in FIG. 1(A). It should be noted that in FIG. 2, the scale in the grating depth direction has been drawn out of proportion.

As shown in these figures, the diffractive optical element 1 includes a first element portion 2 and a second element portion 3. A first diffraction grating 8 is formed on the first element portion 2, and a second diffraction grating 9 is formed on the second element portion 3. The first element portion 2 and the second element portion 3 are layered (laminated) in proximity to each other, sandwiching an air layer 10 between them. The first element portion 2, the second element portion 3 and the air layer 10 together function as one diffractive optical element.

The first and second diffraction grating 8 and 9 have a concentric circular grating shape, and by changing their grating pitch in the radial direction, they act as a lens. Furthermore, the first diffraction grating 8 and the second diffraction grating 9 have substantially the same grating pitch distribution. That is to say, at equal positions in the radial direction, their grating pitch is the same.

Furthermore, as shown in FIG. 2, the first element portion 2 includes a first transparent substrate 4, and a first grating formation layer made of a grating base portion 6 disposed on the first transparent substrate 4 and a first diffraction grating 8 formed integrally with the grating base portion 6. A grating surface 8a is formed at the border between the first diffraction grating 8 and the air layer 10.

On the other side, like the first element portion 2, the second element portion 3 includes a second transparent substrate 5, and a second grating formation layer made of a grating base portion 7 disposed on the second transparent substrate 5 and a second diffraction grating 9 formed integrally with the grating base portion 7. A grating surface 9a is formed at the border between the second diffraction grating 9 and the air layer 10.

Furthermore, the height of the air layer 10 is set such that a distance (interval) D is attained between the edges defined by the grating side surfaces and the grating surfaces 8a and 9a of the two diffraction gratings 8 and 9.

Here, the dimensions of the first and second element portions 2 and 3 satisfy the following conditions:

$$d_1/P_1 < \tfrac{1}{6}$$

$$d_2/P_2 < \tfrac{1}{6}$$

where $P_1$ and $P_2$ are the grating pitch (in $\mu$m) of the first and second element portions 2 and 3 (namely, the first and second diffraction gratings 8 and 9 ), and $d_1$ and $d_2$ are the grating thicknesses (in $\mu$m) of the first and second diffraction gratings 8 and 9.

This has the advantage that the grating shape can be machined easily in the element portions 2 and 3 and in the dies for manufacturing (resin molding) those element portions 2 and 3.

In this embodiment, the wavelength region of the light incident on the diffractive optical element 1, that is, the used wavelength region, is the visible wavelength region. Furthermore, the materials constituting the first and second diffraction gratings 8 and 9 as well as their grating thicknesses are selected such that the diffraction efficiency of the first-order diffracted light becomes high over the entire visible wavelength region.

Figure 16:
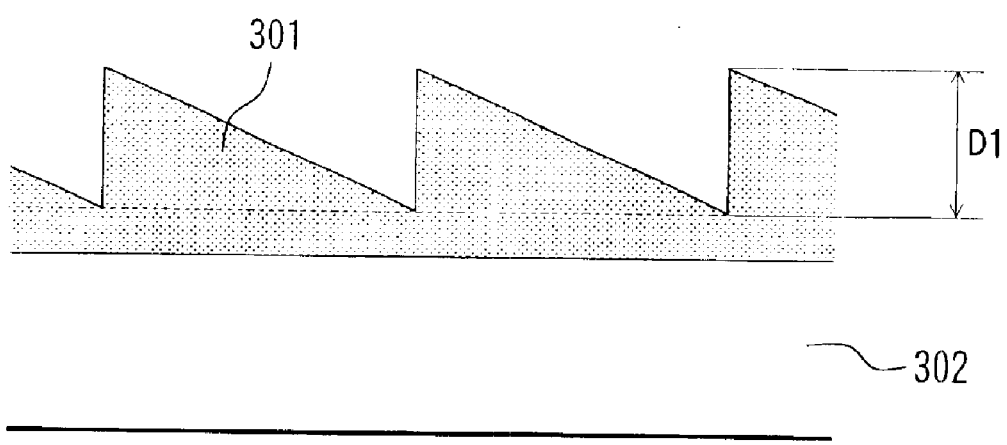
FIG. 16 is a partial cross-sectional view of a conventional single-layer diffractive optical element.
Figure 17:
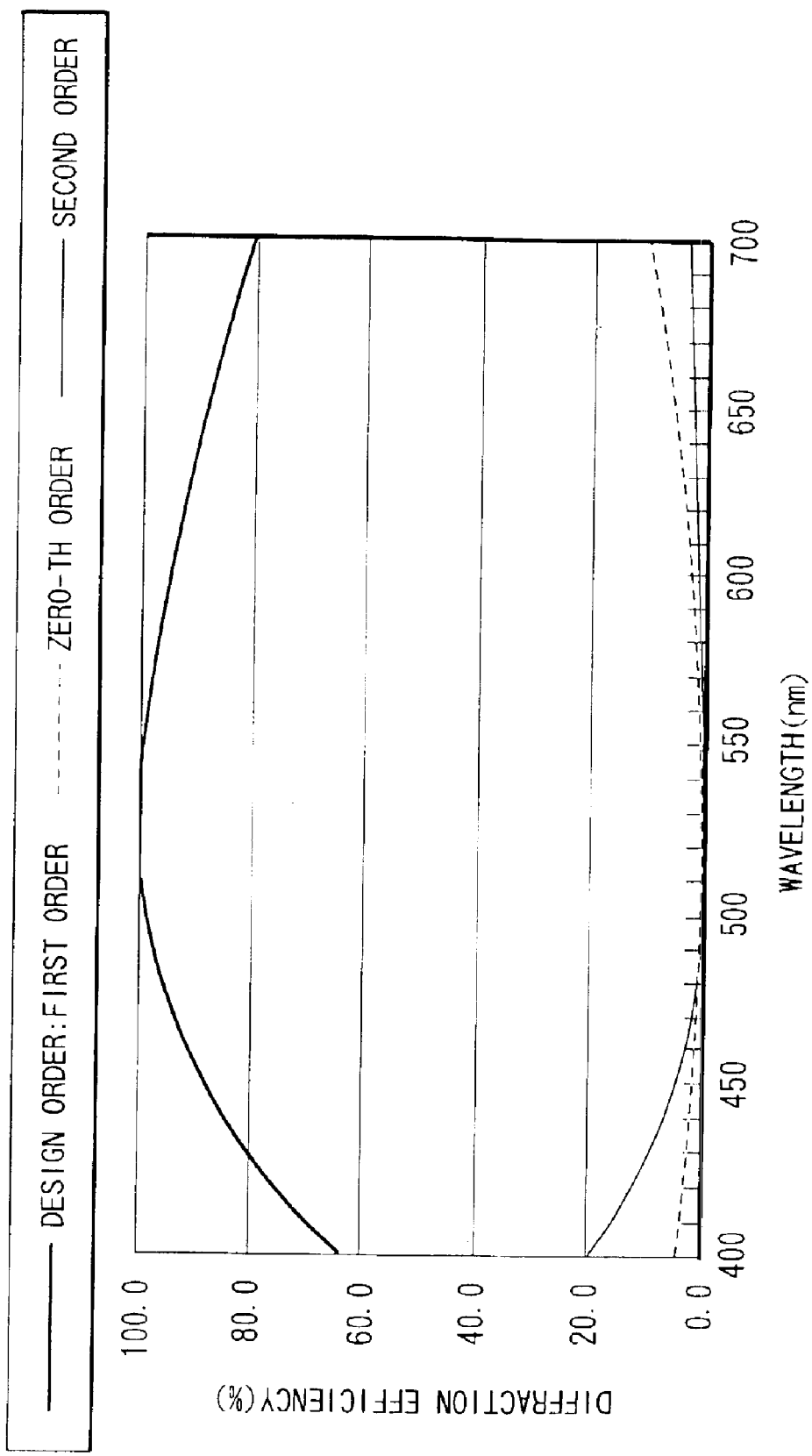
FIG. 17 is a graph illustrating the diffraction efficiency characteristics for light of the design order of the conventional single-layer diffractive optical element.
Figure 18:
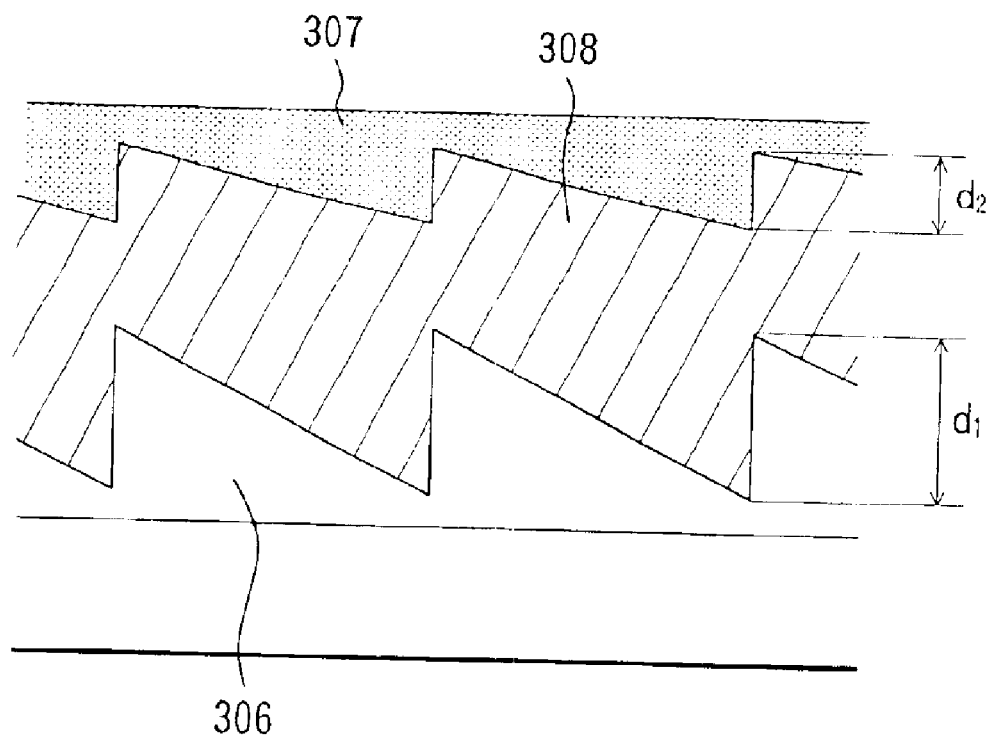
FIG. 18 is a partial cross-sectional view of a conventional layered diffractive optical element.
Figure 19:
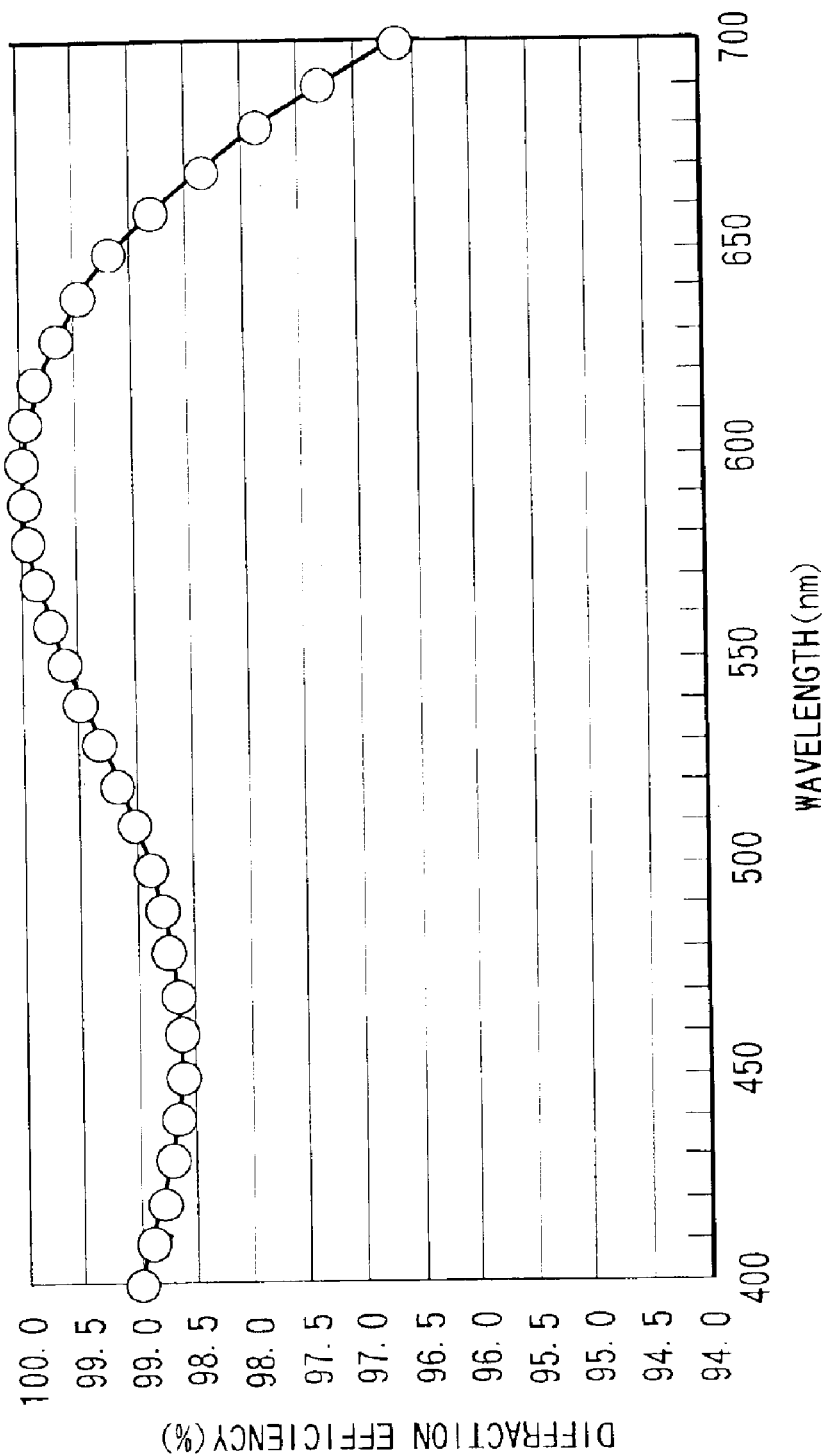
FIG. 19 is a graph illustrating the diffraction efficiency characteristics for light of the design order of a conventional layered diffractive optical element.

The following is an explanation of the diffraction efficiency of the diffractive optical element 1 of the present embodiment. In the conventional single-layer DOE shown in FIG. 16, the conditions under which the diffraction efficiency of diffraction light of a certain order becomes maximal for a design wavelength $\lambda_0$ is that when light rays are incident perpendicularly to the base surface (indicated by a broken line in FIG. 16) of the diffraction grating, then the optical path length difference at the peaks and valleys of the diffraction grating (that is, the difference between the optical path length of light rays passing through peaks and that of light rays passing through valleys) becomes an integer multiple of the wavelength of the light rays. This can be represented by the following expression:

$$(n_{01}-1)d = m\lambda_0 \qquad (2)$$

Here, $n_{01}$ is the refractive index of the material of the diffraction grating for light of the wavelength $\lambda_0$, d is the grating thickness and m is the diffraction order.

Since Expression (2) includes a wavelength term, the expression is, at a given order, only true for the design wavelength, and the diffraction efficiency drops from the maximum value for all wavelengths other than the design wavelength.

The diffraction efficiency $\eta(\lambda)$ for any wavelength $\lambda$ can be represented by the following expression:

$$\eta(\lambda) = \mathrm{sinc}^2[p\{M-(n_1(\lambda)-1)d/\lambda\}] \qquad (3)$$

In Expression (3), M is the order of diffraction light to be evaluated, and $n_1(\lambda)$ is the refractive index of the material of the diffraction grating for light of the wavelength $\lambda$. Furthermore, $\mathrm{sinc}^2(x)$ is the function represented by $\{\sin(x)/x\}^2$.

In this embodiment, even with a diffractive optical element having a layered structure of two or more layers, the basics are the same, and since all layers together act as one diffractive optical element, the optical path length difference between peaks and valleys of the diffraction grating formed at the border between the materials (including air or the like) constituting the layers is determined, and the dimensions of the grating shape etc. are set such that that optical path length difference for the combination of all diffraction gratings becomes an integer multiple of the wavelength.

Consequently, in the diffractive optical element 1 shown in FIG. 1, for a design wavelength of $\lambda_0$, the condition under which the diffraction efficiency of diffracted light of the diffraction order m becomes maximal can be represented by the following expression:

$$\pm(n_{01}-1)d_1 \pm (n_{02}-1)d_2 = m\lambda_0 \qquad (4)$$

In Expression (4), $n_{01}$ is the refractive index of the material of the first diffraction grating 8 at the first element portion 2 for light of the wavelength $\lambda_0$, $n_{02}$ is the refractive index of the material of the second diffraction grating 9 at the second element portion 3 for light of the wavelength $\lambda_0$, and $d_1$ and $d_2$ are the grating thicknesses of the first diffraction grating 8 and the second diffraction grating 9, respectively.

The diffraction orders of light diffracted downwards from the zero-th order diffracted light in FIG. 2 are denoted as positive diffraction orders, whereas the diffraction orders of light diffracted upwards from the zero-th order diffracted light in FIG. 2 are denoted as negative diffraction orders. In this case, the plus or minus sign for each layer in Expression (3) becomes negative in the case of the first diffraction grating 8 which has a grating shape whose thickness decreases from top to bottom in FIG. 2, and conversely, becomes positive in the case of the second diffraction grating 9 which has a grating shape whose thickness increases from top to bottom in FIG. 2.

In the structure shown in FIG. 2, the diffraction efficiency $\eta(\lambda)$ for wavelengths $\lambda$ besides the design wavelength $\lambda_0$ can be represented by the following expression:

$$\begin{aligned}\eta(\lambda) &= \mathrm{sinc}^2[p\{M - \{\pm(n_1(\lambda)-1)d_1 \pm (n_2(\lambda)-1)d_2\}/\lambda\}] \\ &= \mathrm{sinc}^2[p\{M - \Phi(\lambda)/\lambda\}]\end{aligned} \qquad (5)$$

In Expression (5), $\Phi(\lambda)$ is defined as follows:

$$\Phi(\lambda) = \pm(n_1(\lambda)-1)d_1 \pm (n_2(\lambda)-1)d_2$$

Moreover, M is the order of diffraction light to be evaluated, $n_1(\lambda)$ is the refractive index of the material of the first diffraction grating 8 for light of the wavelength $\lambda$, $n_2(\lambda)$ is the refractive index of the material of the second diffraction grating 9 for light of the wavelength $\lambda$, $d_1$ and $d_2$ are the grating thicknesses of the first diffraction grating 8 and the second diffraction grating 9. Furthermore, $\mathrm{sinc}^2(x)$ is the function represented by $\{\sin(x)/x\}^2$.

It should be noted that in the diffractive optical element 1 in FIG. 2, the grating surfaces 8a and 9a are formed at the border surface to the air layer 10, but the diffractive optical element of the present invention is not limited to this. For example, as shown in FIGS. 9(A) and 9(B), it is also possible to use a diffraction grating, in which a grating surface is formed at the border surface of two different materials (optical materials) that are different from air.

Figure 9:
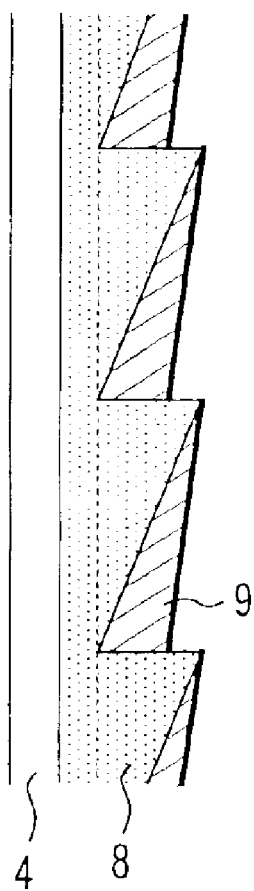
FIGS. 9(A) and 9(B) are partial cross-sectional views of diffractive optical elements according to other embodiments of the present invention.
Figure 9:
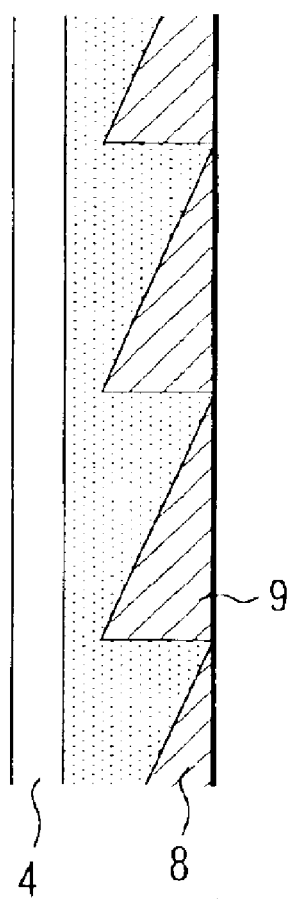

FIG. 9(A) shows a diffractive optical element in which diffraction gratings 8 and 9 having different grating thickness make contact with each other, and FIG. 9(B) shows a diffractive optical element in which diffraction gratings 8 and 9 having the same grating thickness make contact with each other. Depending on the combination of the materials constituting the diffraction gratings, the grating thickness of the two diffraction gratings 8 and 9 as shown in FIG. 9(B) can also be made equal or not.

The following is an explanation of the conditions for attaining a high diffraction efficiency in the diffractive optical element 1 of the present embodiment.

In order to attain a high diffraction efficiency across the entire used wavelength region, the value $\eta(\lambda)$ defined in Expression (5) should be close to 1 for all used wavelengths $\lambda$. In other words, it can be seen from this expression that in order to increase the diffraction efficiency at the design order m, $\Phi(\lambda)/\lambda\}$ should be m in Expression (5). For example, when the design order m is the first order, then $\Phi(\lambda)/\lambda$ should be close to 1.

Moreover, it can be seen from the above relation that the optical path length difference $\Phi(\lambda)$ attained from the grating shape needs to change linearly in proportion to the wavelength $\lambda$.

For this reason, the wavelength-dependent term in the expression representing the optical path length difference $\Phi(\lambda)$, namely $$\pm n_1(\lambda)d_1 \pm n_2(\lambda)d_2$$

needs to be linear. That is to say, refractive index changes due to the wavelength in the material forming the second diffraction grating 9 need to have a constant ratio over the entire used wavelength region with respect to refractive index changes due to the wavelength of the material forming the first diffraction grating 8.

This can be expressed by the following expression:

$$n_1(\lambda_1) - n_1(\lambda_2) : n_2(\lambda_1) - n_2(\lambda_2) = n_1(\lambda_3) - n_1(\lambda_4) : n_2(\lambda_3) - n_2(\lambda_4) \quad (6)$$

where $\lambda_1$, $\lambda_2$, $\lambda_3$ and $\lambda_4$ indicate any used wavelength.

Next, the diffractive optical element 1 with the layered structure shown in FIG. 2 is explained as an example of a structure that substantially satisfies Expression (6). First of all, in order to attain a high diffraction efficiency, at least two diffraction gratings should be present. The diffractive optical element 1 shown in FIG. 2 satisfies this condition.

In the diffractive optical element 1 in FIG. 2, a material characteristic for the present embodiment ($n_d$=1.5702, $v_d$=13.5) is used for the first diffraction grating 8, and its grating thickness is set to 5.6 $\mu$m. On the other hand, UV-curing resin C001 ($n_d$=1.524, $v_d$=50.8), made by Dainippon Ink and Chemicals, Inc., is used for the second diffraction grating 9, and its grating thickness is set to 7.2 $\mu$m.

Figure 3:
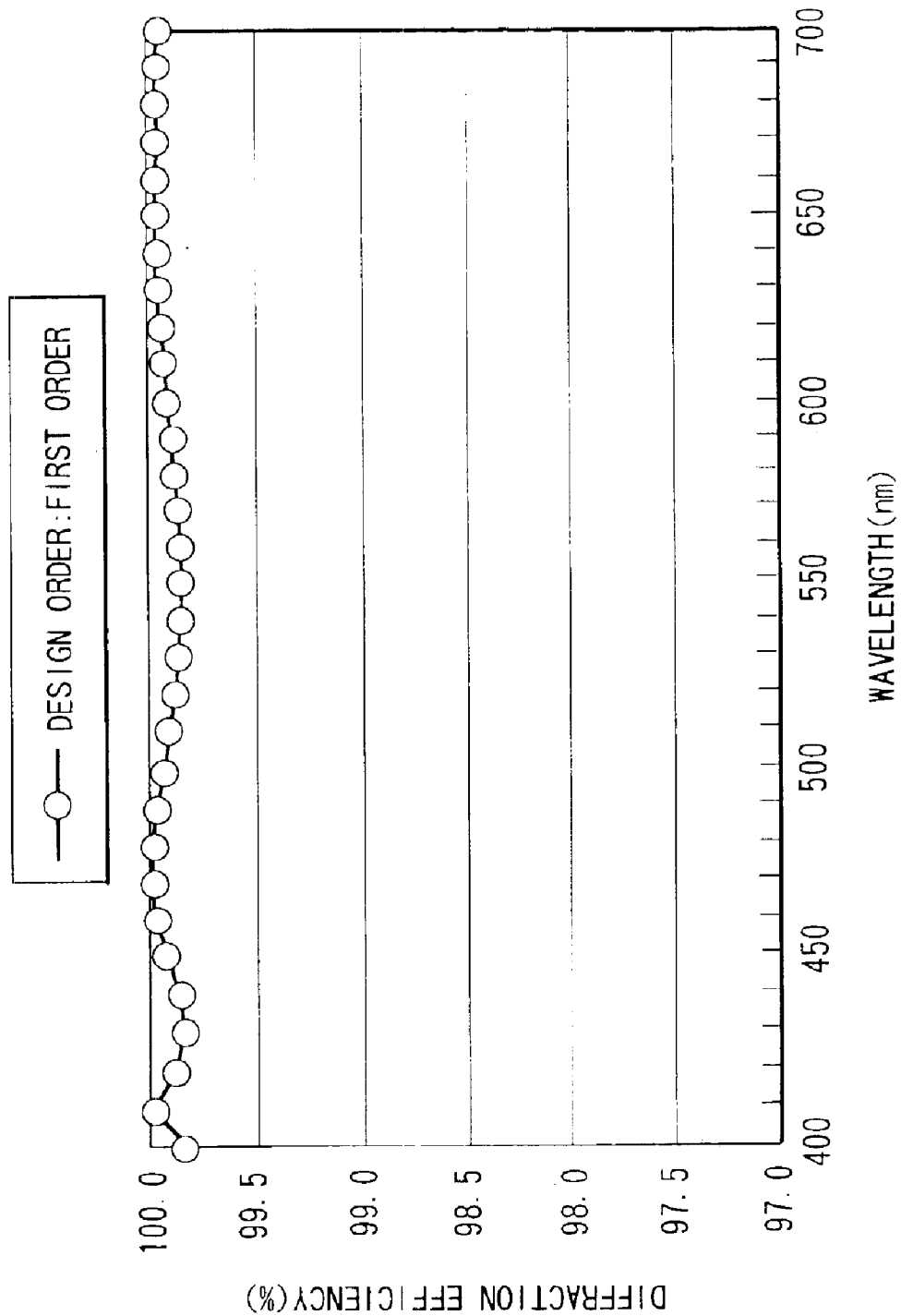
FIG. 3 is a graph illustrating the diffraction efficiency characteristics for light of the design order of the diffractive optical element of Embodiment 1.
Figure 4:
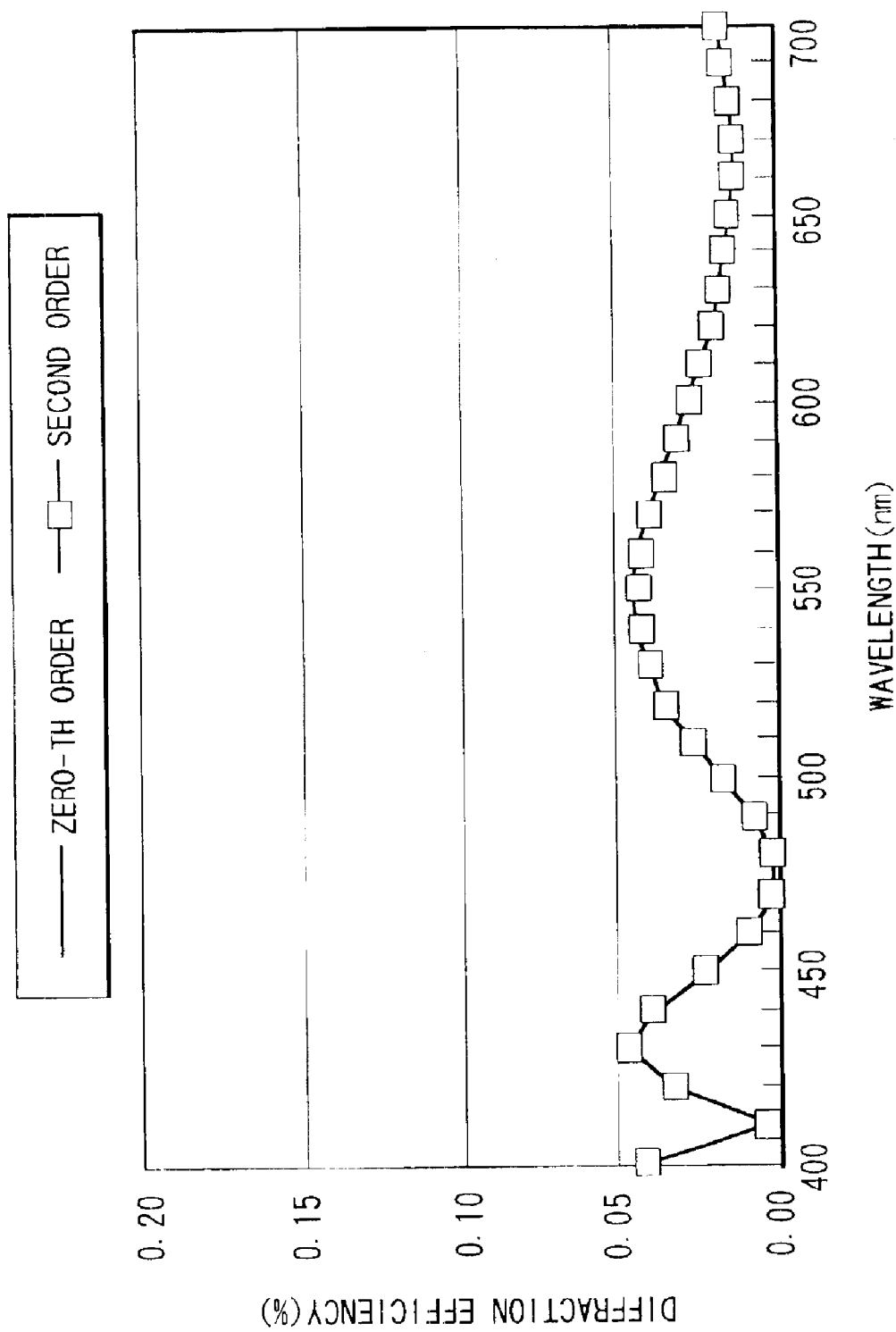
FIG. 4 is a graph illustrating the diffraction efficiency characteristics of the design order plus or minus 1 order light of the diffractive optical element of Embodiment 1.

FIG. 3 shows the diffraction efficiency characteristics of first-order (design order) diffraction of this diffractive optical element 1, and FIG. 4 shows the diffraction efficiency characteristics of diffraction of zero-th order and second-order, which are the orders plus or minus 1 of the design order, of this diffractive optical element 1.

Figure 14:
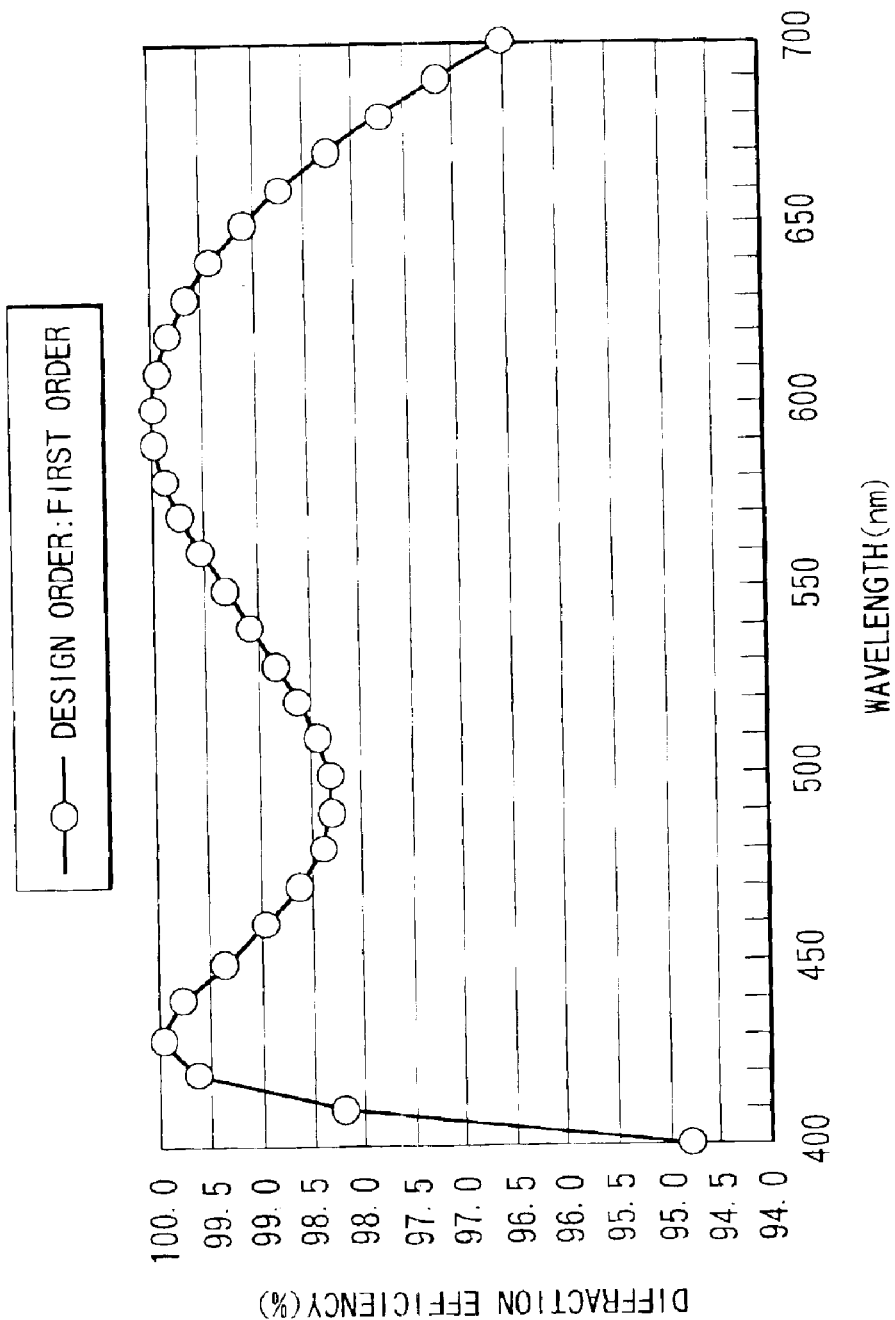
FIG. 14 is a graph illustrating the diffraction efficiency characteristics for light of the design order of a conventional layered diffractive optical element.
Figure 15:
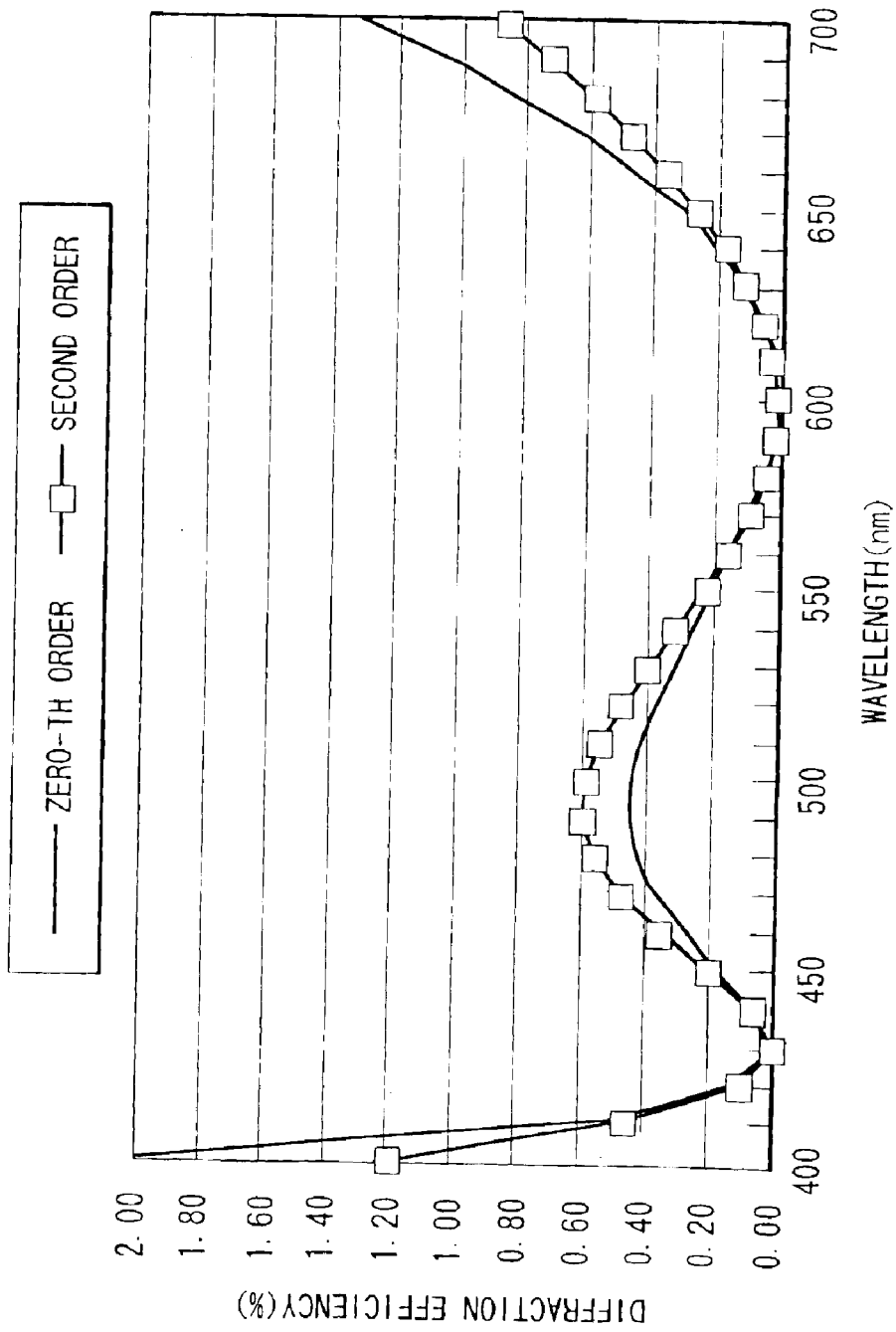
FIG. 15 is a graph illustrating the diffraction efficiency characteristics of the design order plus or minus 1 order light of the conventional layered diffractive optical element.

As can be seen from these graphs, the diffractive optical element 1 has a design order diffraction efficiency that is improved compared to the diffraction efficiency shown in FIGS. 14 and 15, whereas the diffraction efficiencies of the unnecessary orders are reduced, so that less flare light is produced.

Furthermore, the diffraction efficiency of the design order is 99.7% or more over the entire visible wavelength region, and correspondingly the flare light of unnecessary orders is 0.05% or less over the entire visible wavelength region, reducing it to about ⅒ of that in diffractive optical elements using conventional materials.

Here, the diffraction efficiency of unnecessary orders is only evaluated for zero-th order and second order, which are the orders plus or minus 1 of the design order, but if the flare light of zero-th order and second-order diffraction is reduced, then flare light of other orders can be reduced as well, since the contribution to the flare diminishes the further the order is separated from the design order.

The reason for this is that in diffractive optical elements that are designed such that mainly light of a specific design order is diffracted, the diffraction efficiency tends to be decreased when moving away from the design order, and blurring on the imaging plane becomes grater the more the order is separated from the design order, so that it is less noticeable as flare.

Figure 5:
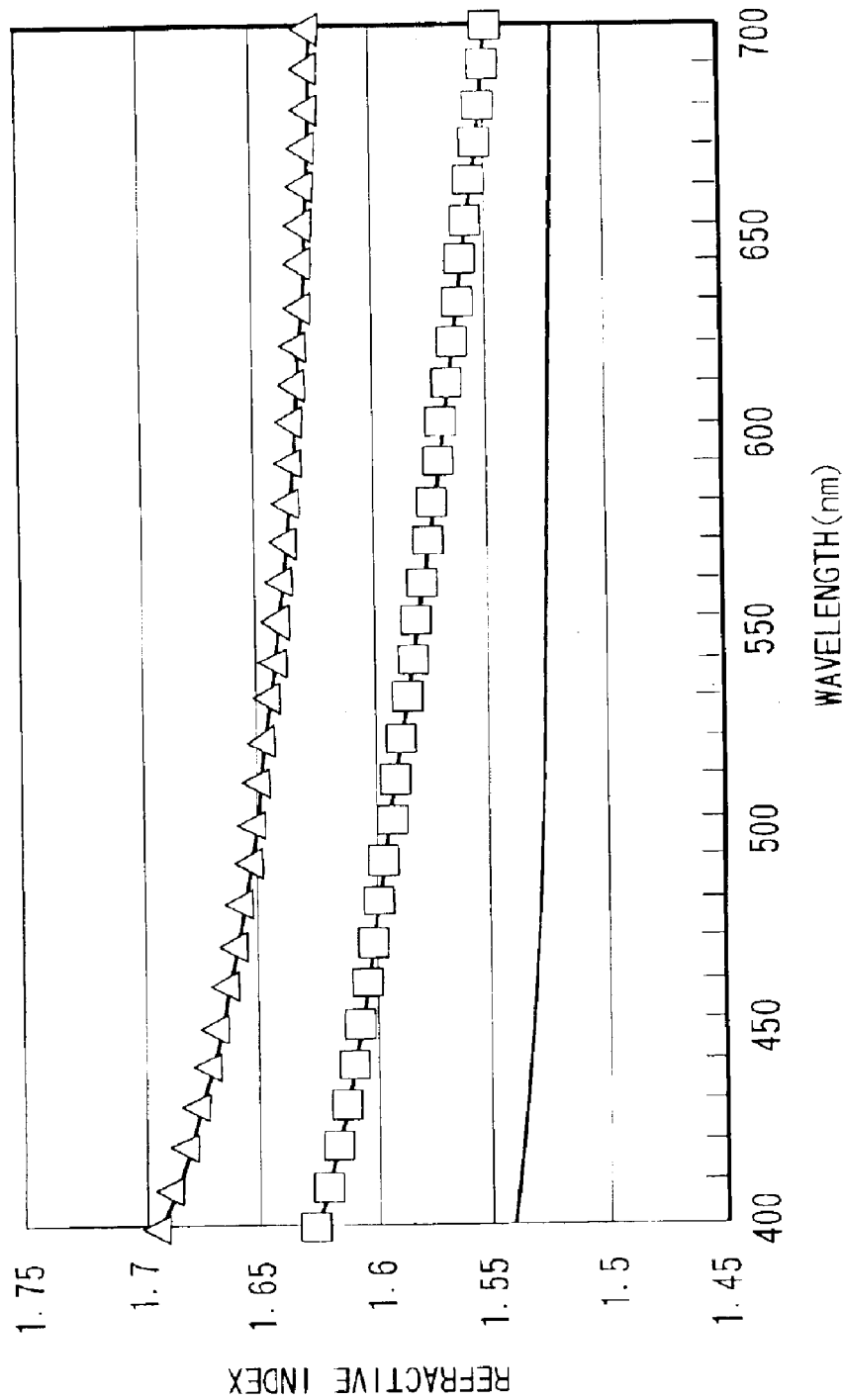
FIG. 5 is a graph illustrating the refractive index characteristics ($n_d$ as a function of $\lambda$) of a material constituting the diffractive optical element of Embodiment 1.

Next, FIG. 5 shows the refractive index characteristics in the visible wavelength region of the material described in the above-mentioned Japanese Patent Laid-Open No. 2000-98118 and the materials that are characteristic for the present embodiment. In FIG. 5, the horizontal axis marks the wavelength and the vertical axis marks the refractive index. In FIG. 5, material 1 denotes the material used for both the second diffraction grating 9 of the present embodiment and the second diffraction grating of the diffraction optical element described in Japanese Patent Laid-Open No. 2000-98118, and material 2 denotes the material constituting the first diffraction grating 8 of the present embodiment. Furthermore, material 3 denotes the material constituting the first diffraction grating described in Japanese Patent Laid-Open No. 2000-98118.

In FIG. 5, the slope of the graph appears to be different for the material 1 and the material 2 used in the present embodiment, but the change of the refractive index with respect to the change of the wavelength is substantially constant.

On the other hand, for the material 1 and the material 3, which are used in the diffractive optical element described in Japanese Patent Laid-Open No. 2000-98118, the change of the refractive index of the material 1 with respect to the wavelength is substantially constant, whereas for the material 3, the rate of change is larger or the short-wavelength side.

The reason for this is that, since the characteristics of the Abbe number $v_d$ described in Japanese Patent Laid-Open No. 2000-98118 are as shown in Expression (7) below, it is merely the value defining the average slope of the refractive index change near the d-line (at a wavelength of 587 nm).

$$v_d = (n_d - 1)/(n_F - n_c) \quad (7)$$

In Expression (7), $n_F$, $n_d$ and $n_c$ are the refractive indices at the F-line, the d-line and the C-line, respectively.

In layered diffractive optical elements, the characteristics of $\nu_d$ are suitable for improving the diffraction efficiency compared to that of single-layered DOEs while maintaining the grating thickness thin. However, various investigations have made it clear that in order to improve the diffraction efficiency characteristics even further, as is the object of the present invention, it is insufficient to adjust only, as conventionally, the evaluation measure of $\nu_d$, representing the average refractive index change.

In order to clarify the difference between the two materials, that is, the material 2 and the material 3, we have found an evaluation measure used as a property of optical glass materials.

Figure 6:
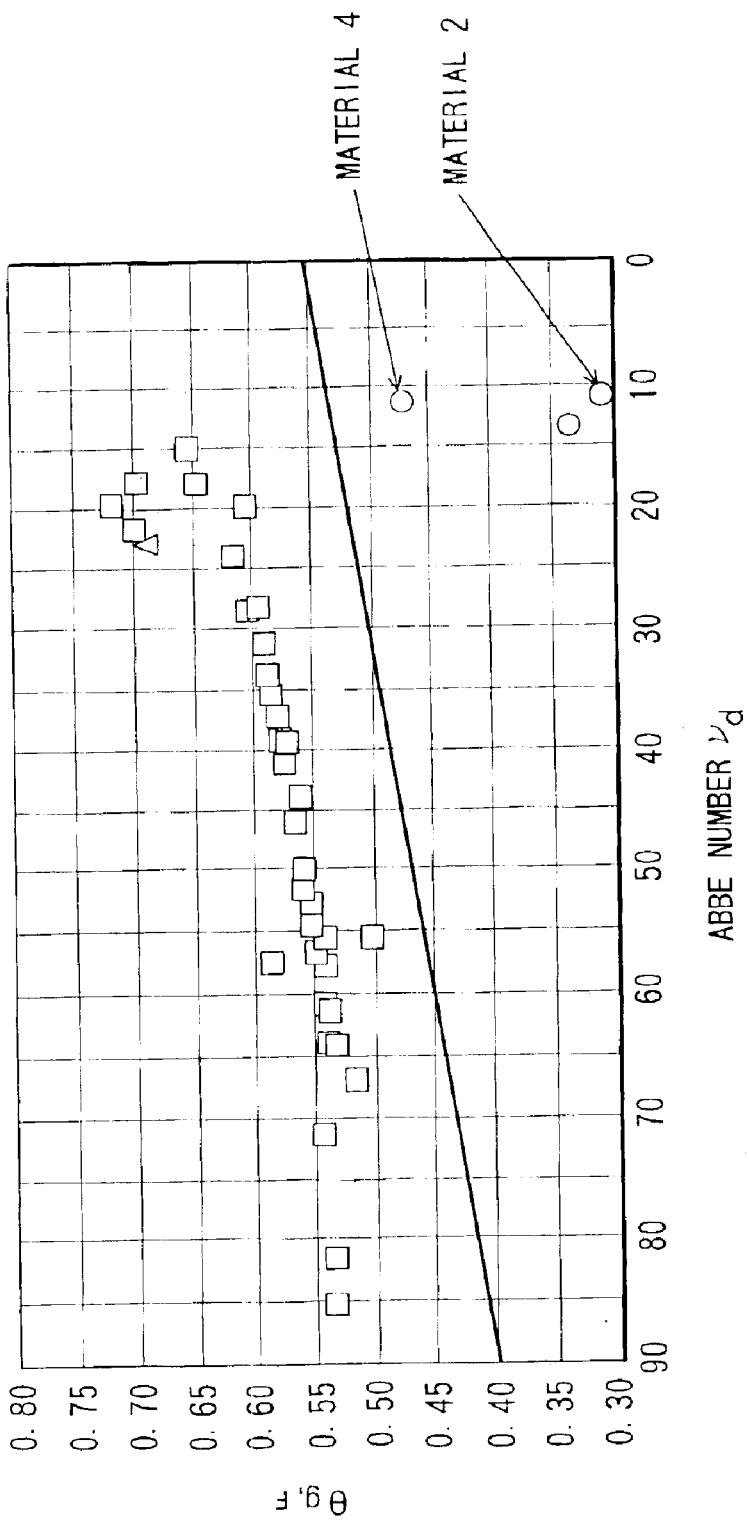
FIG. 6 is a graph illustrating the characteristics of the partial dispersion ratio ($\theta_{g,F}$ as a function of $v_d$) of a material constituting the diffractive optical element of Embodiment 1.

FIG. 6 shows the characteristics of the partial dispersion ratio $\theta_{g,F}$ with respect to the g-line and the F-line, which is that evaluation measure. In FIG. 6, the horizontal axis denotes $\nu_d$, and the vertical axis denotes $\theta_{g,F}$. $\theta_{g,F}$ is defined as in Expression (8) below, and is an evaluation measure representing the ratio between the change in refractive index on the short-wavelength side and the change in refractive index on the long-wavelength side.

$$\theta_{g,F}=(n_g-n_F)/(n_F-n_C) \quad (8)$$

In Expression (8), $n_g$, $n_F$, $n_d$ and $n_c$ are the refractive indices at the g-line, the F-line, the d-line and the C-line, respectively.

The material 2 in FIG. 6 is the material used for the first diffraction grating 8 in the present embodiment, and for this material 2, $\theta_{g,F}$ has a relatively small value of about 0.3.

The material 3 is the material described in Japanese Patent Laid-Open No. 2000-98118, and this material 3 belongs to the ordinary optical materials. Moreover, it can also be seen from FIG. 6 that the material 2 in the present embodiment has $\theta_{g,F}$ characteristics that are considerably different from the $\theta_{g,F}$ characteristics of the ordinary optical materials including the material described in Japanese Patent Laid-Open No. 2000-98118.

Figure 7:
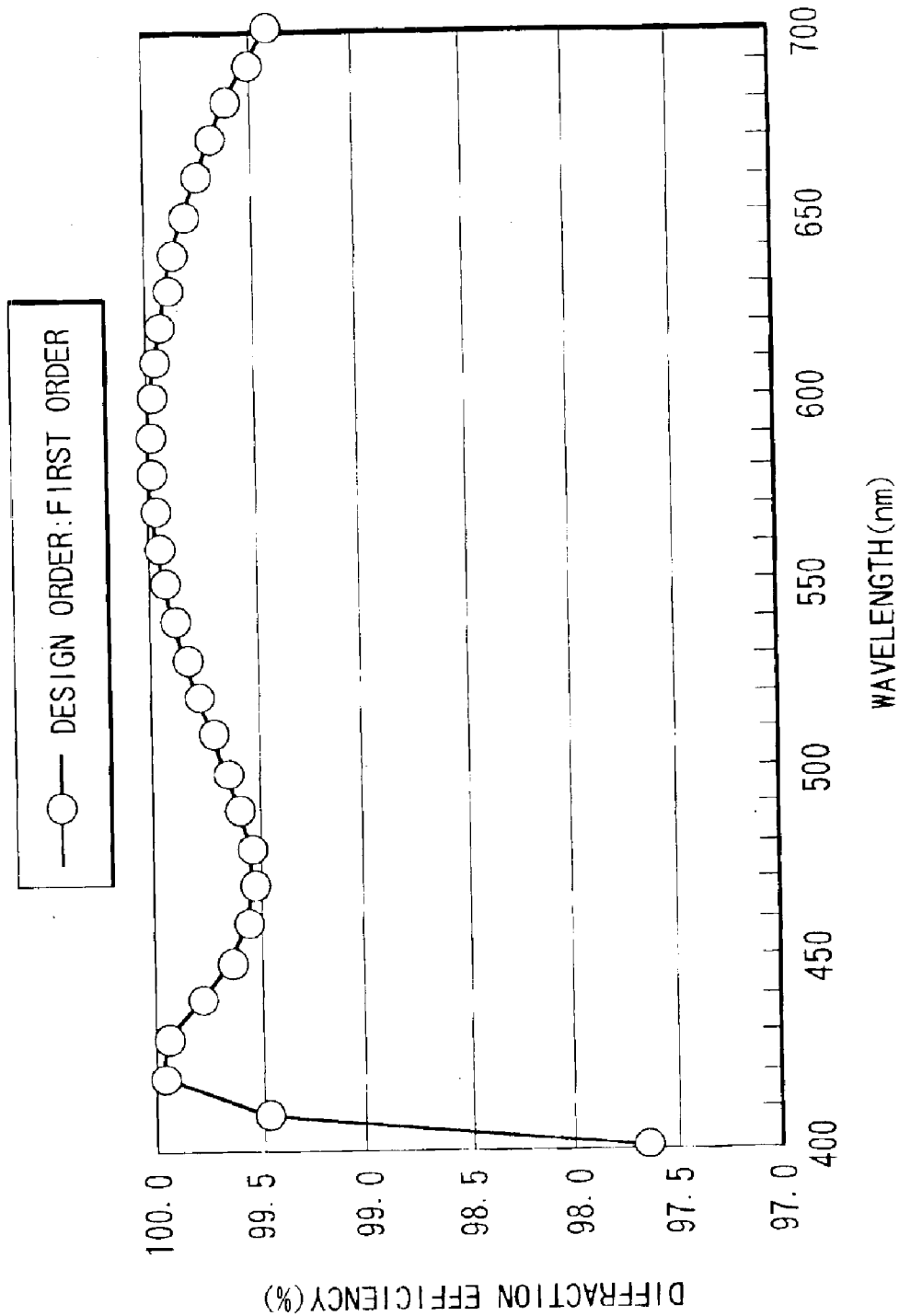
FIG. 7 is a graph illustrating the diffraction efficiency characteristics of light of the design order when using another material in the diffractive optical element of Embodiment 1.
Figure 8:
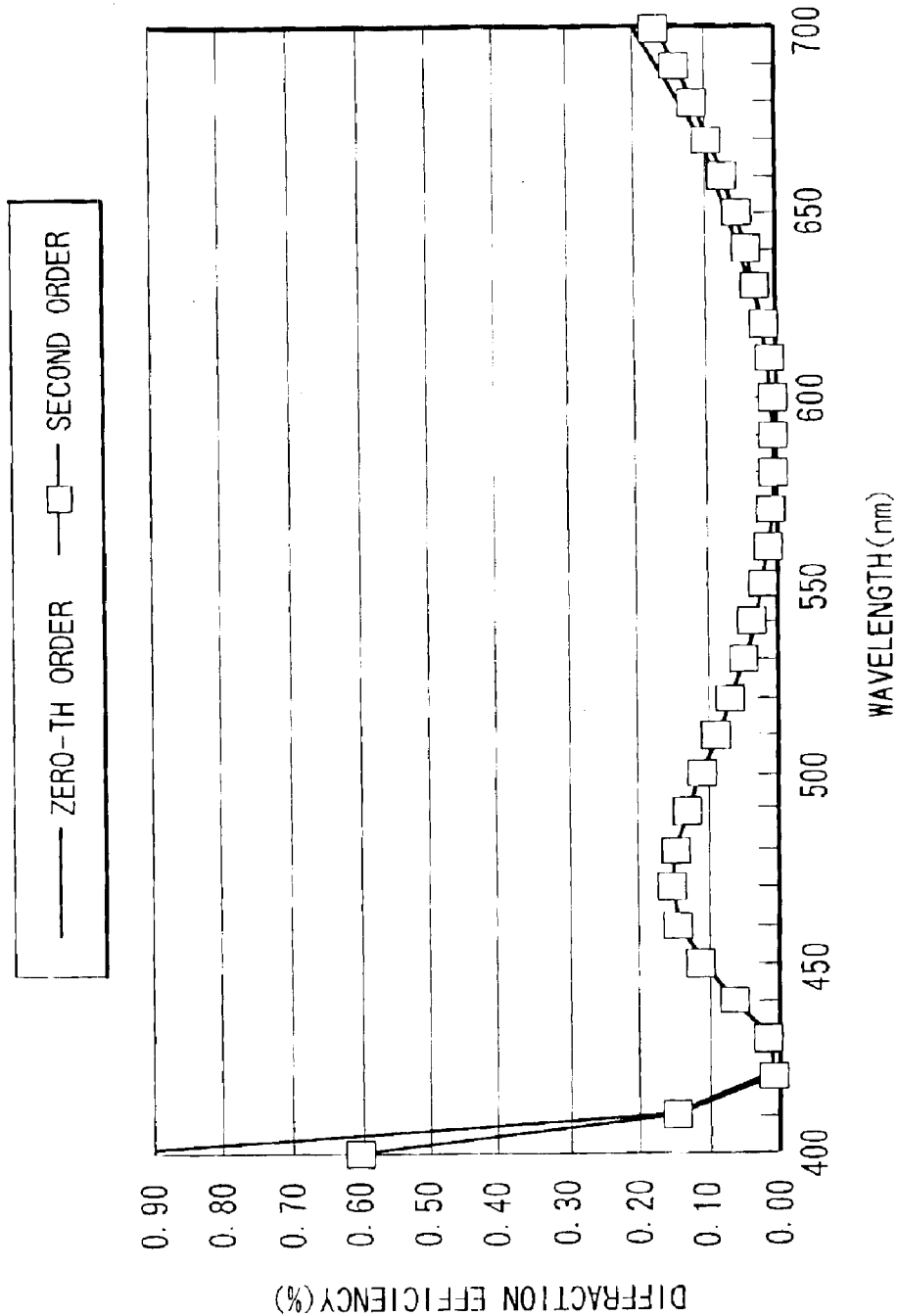
FIG. 8 is a graph illustrating the diffraction efficiency characteristics of the diffraction orders plus or minus 1 of the design order when using another material in the diffractive optical element of Embodiment 1.

FIGS. 7 and 8 illustrate the diffraction efficiency of a diffractive optical element using the optical material shown as material 4 in FIG. 6. FIG. 7 shows the diffraction efficiency characteristics for the first order (i.e. the design order), whereas FIG. 8 shows the diffraction efficiency characteristics for the zero-th order and the second order, which are plus or minus 1 of the design order. For the design order, a high diffraction efficiency is attained that is 97% or more for the entire used wavelength region and 99.5% or more over the main wavelength region of 450 nm to 650 nm.

On the other hand, flare light of unnecessary diffraction orders is sufficiently suppressed to about ⅓ of the conventional example, namely to 0.9% or less over the used wavelength region and 0.2% or less over the main wavelength region of 450 nm to 650 nm.

As can be seen from the above, also with the material 4, adequate diffraction efficiency characteristics are attained with regard to the $\theta_{g,F}$ characteristics.

Consequently, in order to improve the diffraction efficiency, as is the object of the present invention, the value of $\theta_{g,F}$ should be smaller than the straight solid line in FIG. 6, that is to say, an optical material should be used that satisfies the following expression:

$$\theta_{g,F}<(-1/600)\nu_d+0.55 \quad (1)$$

ITO (Indium-Tin Oxide) is one of the materials that displays such optical characteristics. However, if it is difficult to fabricate the grating shape directly with ITO, then it is preferable to use a material as material 2 or material 4, obtained, as proposed in Japanese Patent Laid-Open No. 2001-74901 (corresponding to the published European Patent Application No. 1065531 A3), by forming ITO into micro-particles with a diameter of nanometer order and mixing those micro-particles into a resin material with which it is easy to form a grating shape.

Furthermore, if for that material a material with an Abbe number of 30 or less is used, then the grating thickness of the diffraction grating can be made small, which is preferable.

Also for the optical material obtained by mixing micro-particles into the resin material it is desirable that the Abbe number after mixing the micro-particles is 30 or less, and for this reason, it is desirable that a micro-particle material is used that has an Abbe number of 15 or less.

Furthermore, it is preferable that the size (diameter) of the used micro-particles is ¹⁄₂₀ or less of the used wavelength, so that the light is not scattered by the mixed micro-particles.

On the other hand, when a material with an Abbe number of 40 or more is used as the material for forming the second diffraction grating 9, then a thin grating thickness can be maintained, which is preferable.

Furthermore, if optical glass is used for the material for forming the second diffraction grating 8 and the material for forming the first diffraction grating 9, and if the transparent substrates 4 and 5 shown in FIG. 2 and that optical glass material are the same material, then both can be integrally manufactured, which reduces the number of components and is advantageous with regard to reducing costs.

Furthermore, it is preferable that the grating shapes of the diffraction gratings 8 and 9 both satisfy the following expression:

$$d/P<1/6 \quad (9)$$

where P is the grating pitch, and d is the grating thickness.

In this case, the die for resin molding the diffraction gratings 8 and 9 becomes easy to manufacture.

It should be noted that the above-described Embodiment 1 has been explained for diffractive optical elements (layered DOEs) in which the diffraction gratings 8 and 9 are provided on planar substrates 4 and 5, but similar effects as explained for the present embodiment can also be attained when diffraction gratings are provided on curved surfaces, such as the convex or the concave surface of a lens.

Furthermore, this embodiment has been explained for diffractive optical elements using diffraction light with a design order of 1, that is, first-order diffraction light, but the design order is not limited to 1, and also with diffraction light of orders other than the first order, such as the second or the third order, similar effects as explained for the present embodiment can be attained by setting the combined value of the optical path length differences of the diffraction gratings 8 and 9 to the desired design length at the desired design order.

Embodiment 2

For comparison with conventional diffractive optical elements, Embodiment 1 has been explained for the case that the two diffraction gratings 8 and 9 are made of two different kinds of materials, but the embodiments of the present invention are not limited to this.

Figure 10:
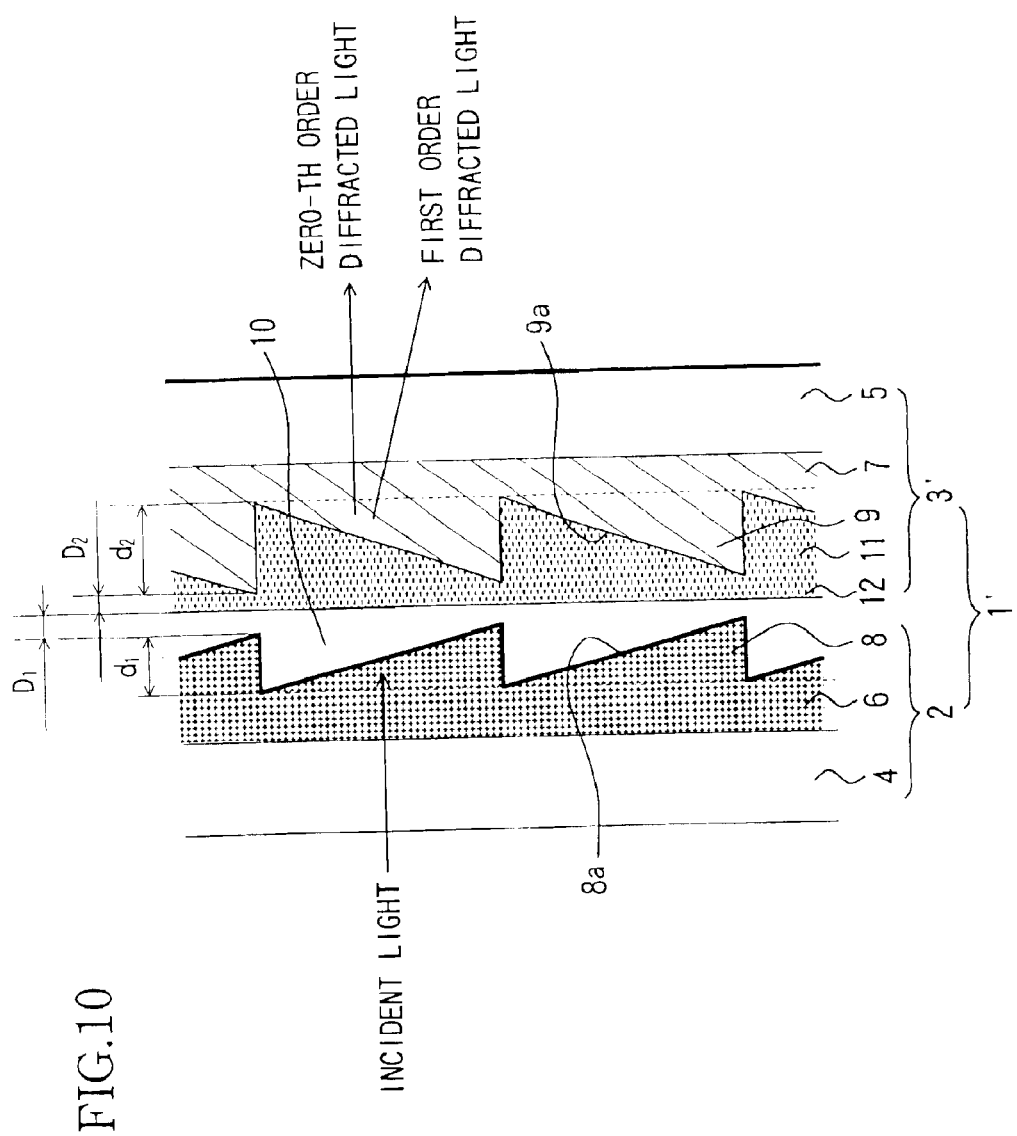
FIG. 10 is a partial cross-sectional view of a diffractive optical element according to Embodiment 2 of the present invention.

For example, as shown in FIG. 10, it is also possible to apply the present invention to a diffractive optical element in which there are three kind of materials constituting these two diffraction gratings 8, 9 and 11 (the materials of the portions denoted by the numeral references 8, 9 and 11 ).

Also in this case, at least one material should be a material that satisfies Expression (1). For example, it is preferable that in the diffractive optical element 1' in FIG. 10, a material satisfying Expression (1) is used for the third diffraction grating 11 that is provided between the second diffraction grating 9 and the air layer 10 and in contact with the grating surface 9a of the second diffraction grating 9.

It should be noted that the meaning of the dimensions of the portions shown in FIG. 10 is the same as in Embodiment 1. $D_1$ is a distance (interval) from the edges defined by the grating side surfaces and the grating surfaces 8a of the first diffraction grating 8 to a border surface 12 between the third diffraction grating 11 and the air layer 10. $D_2$ is a distance (interval) from the edges defined by the grating side surfaces and the grating surfaces 9a of the second diffraction grating 9 to the border surface 12 between the third diffraction gating 11 and the air layer 10.

Embodiment 3

Figure 11:
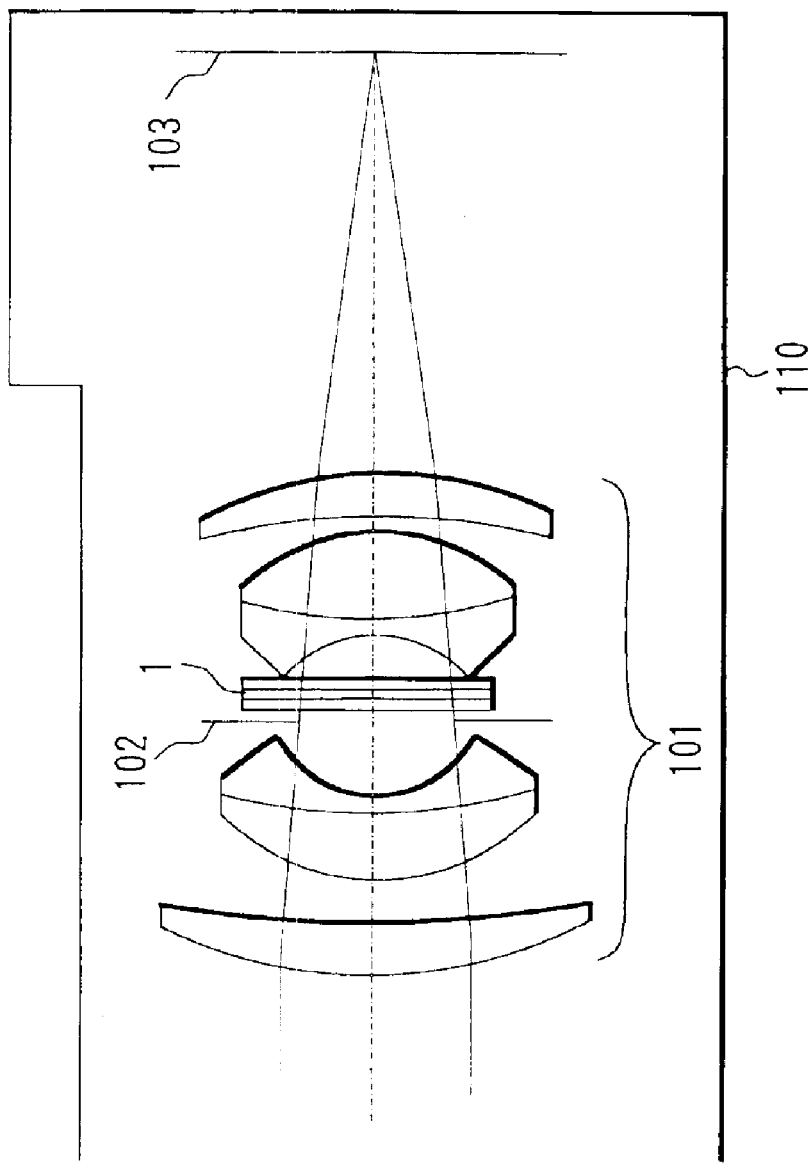
FIG. 11 is a diagrammatic view of an image-taking optical system according to Embodiment 3 of the present invention.

FIG. 11 shows the structure of an image-taking (image-forming) optical system of a camera (such as a still camera or a video camera) according to Embodiment 3 of the present invention. In FIG. 11, numeral reference 110 denotes a camera, and numeral reference 101 denotes an image-taking lens. Inside, the image-taking lens 10 is constituted of mostly refractive optical elements and the refractive optical element 1 explained in Embodiment 1 in at least one part. Also, the image-taking lens 101 has an aperture stop 102.

Numeral reference 103 denotes a recording medium, such as a film, a CCD or CMOS sensor that is arranged on the image-forming surface. The diffractive optical element 1 functions as a lens, and corrects the chromatic aberration caused by the refractive optical element of the image-taking lens 101.

Moreover, as explained for Embodiment 1, the diffractive optical element 1 improves the diffraction efficiency characteristics much better than conventional diffractive optical elements, so that an image-taking optical system is attained, that has little flare light and that has high optical performance and high resolution even at low frequencies.

Moreover, the diffractive optical element 1 has the air layer 10 shown in FIG. 2, so that it is possible to fabricate it with the simple method of manufacturing the diffraction gratings and then gluing them together at their periphery. Consequently, the image-taking optical system is suitable for mass production, and an inexpensive optical system can be provided.

It should be noted that in this embodiment, the diffractive optical element 1 is provided on a planar glass surface arranged near the aperture stop 102, but the location where the diffractive optical element 1 can be provided is not limited to this. As has been explained before, it is also possible to arrange the diffractive optical element 1 on a concave or convex surface of a lens. It is also possible to provide a plurality of diffractive optical elements 1 inside the image-taking lens 101.

Moreover, this embodiment has been explained for the case that the diffractive optical element is used for the image-taking lens of a camera, but there is no limitation to this, and similar effects as explained above can also be attained when the diffractive optical element of the present invention is used for an image-forming optical system that is used for a broad wavelength region, such as the reader lens of an image scanner of an office machine or of a digital copying machine.

Embodiment 4

Figure 12:
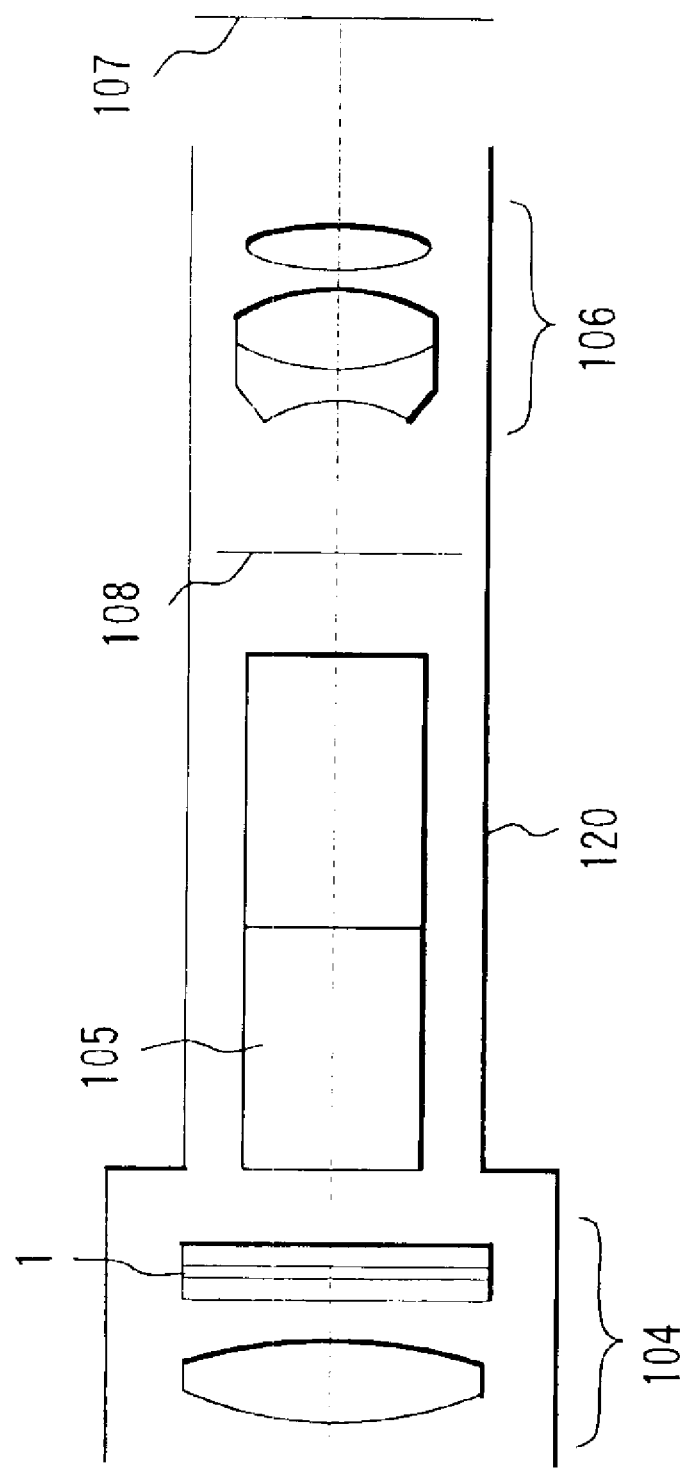
FIG. 12 is a diagrammatic view of an image-taking optical system according to Embodiment 4 of the present invention.
Figure 13:
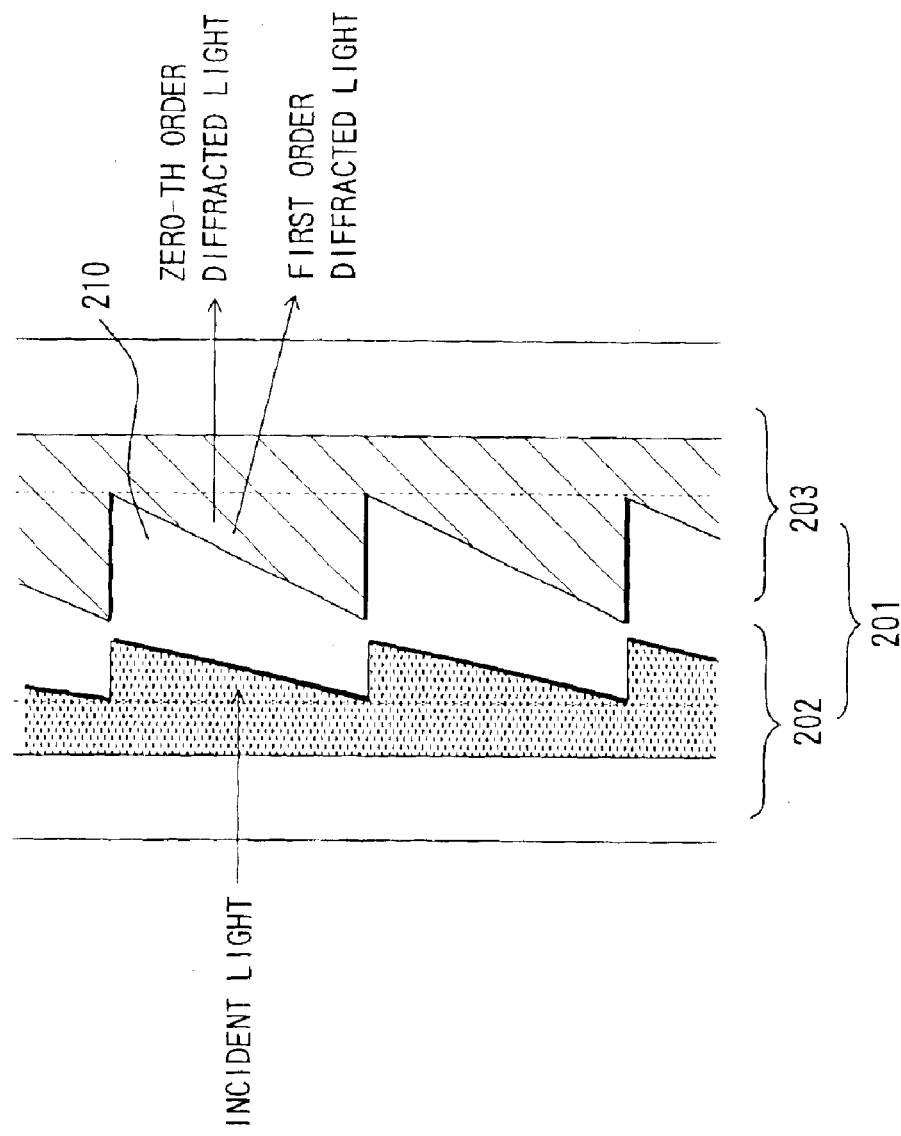
FIG. 13 is a partial cross-sectional view of a conventional layered diffractive optical element.

FIG. 12 shows the structure of one of observing optical systems of a binocular telescope according to Embodiment 4 of the present invention. In FIG. 12, numeral reference 120 denotes the binocular telescope, numeral reference 104 denotes an objective lens, numeral reference 105 denotes a prism for erecting an inverted image, numeral reference 106 denotes an ocular lens, and numeral reference 107 denotes an evaluation surface (pupil surface). Numeral reference 1 denotes the diffractive optical element explained in Embodiment 1, which is provided with the purpose of correcting chromatic aberrations or the like at an image-forming surface 108 of the objective lens 104.

As has been explained in Embodiment 1, the diffraction efficiency characteristics of the diffractive optical element 1 are improved greatly compared to conventional diffractive optical elements, so that it has little flare light and high resolution and high optical performance even at low frequencies.

Moreover, the diffractive optical element 1 has the air layer 10 shown in FIG. 2, so that it is possible to fabricate it with the simple method of manufacturing the diffraction gratings and then gluing them together at their periphery. Consequently, the observing optical system (or the objective lens system) is suitable for mass production, and an inexpensive optical system can be provided.

It should be noted that also this embodiment has been explained for the case that the diffractive optical element 1 is provided on a planar glass surface, but as in Embodiment 3, it is also possible to arrange the diffractive optical element 1 on a concave or convex surface of a lens. It is also possible to provide a plurality of diffractive optical elements 1 inside the observing optical system.

Moreover, this embodiment has been explained for the case that the diffractive optical element 1 is provided inside the objective lens portion 104, but it can also be provided on the surface of the prism 105 or at a location inside the ocular lens 106, and also in this case, similar effects as explained above can be attained. However, providing the diffractive optical element 1 closer to the object side than the image-forming plane 103, there is the effect of reducing only the chromatic aberration of the objective lens portion 104, so that in the case of an observing optical system for the unaided eye, it is desirable that the diffractive optical element 1 is provided at least in the objective lens portion.

Furthermore, this embodiment has been explained for an observing optical system of a binocular telescope, but the diffractive optical element of the present invention also attains similar effects as explained above when applied to observing optical systems of terrestrial telescopes or astronomic telescopes or when applied to the optical finder of a lens shutter camera or a video camera.

As explained above, by adopting a layered diffractive optical element including a plurality of diffraction gratings, of which at least one uses a material whose partial dispersion ratio for the g-line and the F-line is smaller than the value on the right in Expression (1), it is possible to increase the diffraction efficiency of a specific order (design order) over the entire wavelength region of incident light (used wavelengths), while favorably suppressing light of unnecessary diffraction orders that may become flare light when captured by the optical system.

Furthermore, by making the grating thickness of each of the plurality of the respective diffraction gratings 10 $\mu$m or less, it is possible to attain a high diffraction efficiency with a thin diffraction grating shape, and a diffractive optical element can be realized, with which light of unnecessary diffraction orders that may cause flare light even when provided in an optical system with a wide angle of view can be suitably suppressed.

Furthermore, for the same reasons as mentioned above, the Abbe number of the material satisfying Expression (1) should be 30 or less.

Furthermore, when the Abbe number of at least one of the materials of the plurality of diffraction gratings that does not satisfy Expression (1) is set to 40 or more, then the range from which the materials satisfying Expression (1) can be selected becomes broader, which is preferable.

It should be noted that it is possible to improve the moldability of the diffraction grating by using, as a material that satisfies Expression (1), a material that has been obtained by mixing micro-particles of a material with an Abbe number of 15 or less (such as $TiO_2$ or ITO; particles with a diameter of $1/20$ or less of the wavelength of the incident light are particularly suitable) into a resin material (such as a UV curing resin).

Furthermore, it is effective to attain a high diffraction efficiency across the entire used wavelength region by letting the change direction of the grating thickness in the grating period direction of at least one of the plurality of diffraction gratings differ from the change direction of the grating thickness in other diffraction gratings.

Furthermore, the workability of the diffraction gratings can be improved by satisfying Expression (9).

Furthermore, the fabrication of an element portion made of a diffraction grating and a substrate (portion corresponding to a single-layer DOE) becomes easier by making the diffraction gratings of the same material as the (transparent) substrate and forming them in one piece with the substrate, and consequently, also the fabrication of a diffractive optical element made by layering a plurality of element portions on one another also becomes easier.

While preferred embodiments have been described, it is to be understood that modification and variation of the present invention may be made without departing from the spirit or scope of the following claims.

What is claimed is:

1. A diffractive optical element comprising:
    a plurality of diffraction gratings including at least two materials with different Abbe numbers $v_d$, wherein the plurality of diffraction gratings are layered with each other;
    wherein a partial dispersion ratio $\theta_{g,F}$ with respect to a g-line and a F-line of the material constituting at least one of the plurality of diffraction gratings satisfies the following condition:

$\theta_{g,F} < (-1/600)v_d + 0.55$ where $\theta_{g,F} = (n_g - n_F)/(n_F - n_C)$ $v_d = (n_d - 1)/(n_F - n_C)$ and $n_g$, $n_F$, $n_d$ and $n_C$ are the refractive indices at the g-line, the F-line, a d-line and a C-line, respectively, and wherein each of the plurality of diffraction gratings satisfies the following condition:

$d/P < 1/6$ where P is grating pitch and d is grating thickness.

2. The diffractive optical element according to claim 1, wherein the grating thickness of each of the plurality of diffraction gratings is 10 $\mu$m or less.

3. The diffractive optical element according to claim 1, wherein the Abbe number of the material satisfying the condition is 30 or less.

4. The diffractive optical element according to claim 1, wherein the Abbe number of at least one material which does not satisfy the condition, of the plurality of diffraction gratings is 40 or more.

5. The diffractive optical element according to claim 1, wherein the material satisfying the condition is a material obtained by mixing particles whose Abbe number is 15 or less into a resin.

6. The diffractive optical element according to claim 5, wherein a particle diameter of the particles is $1/20$ of the wavelength of incident light or less.

7. The diffractive optical element according to claim 5, wherein the particle material is $TiO_2$ or ITO.

8. The diffractive optical element according to claim 5, wherein the resin material is a UV curing resin.

9. The diffractive optical element according to claim 1, wherein a change direction of the grating thickness in grating period direction of at least one of the plurality of diffraction gratings is different from a change direction of the grating thickness of another diffraction grating.

10. The diffractive optical element according to claim 1, wherein light of a visible wavelength region is incident on the diffractive optical element.

11. An optical system comprising:
    a refractive optical element; and
    a diffractive optical element according to claim 1.

12. The diffractive optical element according to claim 1, wherein the plurality of diffraction gratings include two diffraction gratings which are arranged through an air layer.

* * * * *